(12) United States Patent
Sato (10) Patent No.: US 8,941,763 B2
(45) Date of Patent: Jan. 27, 2015

(54) IMAGE CAPTURE DEVICE, METHOD FOR GENERATING COMPOSITE IMAGE, AND STORAGE MEDIUM

(71) Applicant: Casio Computer Co., Ltd., Shibuya-ku, Tokyo (JP)

(72) Inventor: Takeshi Sato, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 43 days.

(21) Appl. No.: 13/908,724

(22) Filed: Jun. 3, 2013

(65) Prior Publication Data

US 2013/0329091 A1  Dec. 12, 2013

(30) Foreign Application Priority Data

Jun. 6, 2012 (JP) ................................ 2012-129270

(51) Int. Cl.
*H04N 5/217* (2011.01)
*H04N 9/64* (2006.01)

(52) U.S. Cl.
CPC ..................................... *H04N 5/217* (2013.01)
USPC .......... 348/251; 348/155; 348/222.1; 348/241

(58) Field of Classification Search
USPC ............................... 348/155, 222.1, 241, 251
See application file for complete search history.

(56) References Cited

U.S. PATENT DOCUMENTS

| | | | |
|---|---|---|---|
| 7,075,569 B2 | 7/2006 | Niikawa | |
| 7,656,443 B2 * | 2/2010 | Ikeda | 348/246 |
| 7,791,655 B2 | 9/2010 | Makino et al. | |
| 7,907,195 B2 * | 3/2011 | Pinto et al. | 348/251 |
| 8,054,351 B2 * | 11/2011 | Tsuda | 348/251 |
| 8,078,010 B2 * | 12/2011 | Kameyama et al. | 382/299 |
| 8,363,130 B2 * | 1/2013 | Mitsuya et al. | 348/241 |
| 8,478,066 B2 * | 7/2013 | Fujita et al. | 382/274 |
| 8,576,295 B2 * | 11/2013 | Ito | 348/222.1 |

FOREIGN PATENT DOCUMENTS

| | | |
|---|---|---|
| JP | 2002290829 A | 10/2002 |
| JP | 2006-148550 A | 6/2006 |
| JP | 2006-290827 A | 10/2006 |
| JP | 2008092548 A | 4/2008 |
| JP | 2010-056817 A | 3/2010 |

OTHER PUBLICATIONS

Japanese Office Action dated Sep. 17, 2013 (and English translation thereof) in counterpart Japanese Application No. 2012-129270.

* cited by examiner

*Primary Examiner* — Ngoc-Yen Vu
(74) *Attorney, Agent, or Firm* — Holtz, Holtz, Goodman & Chick PC (57) ABSTRACT

The image control unit (51) controls the image capture unit (17) so as to acquire data of captured images successively. The shading correction unit (61) performs the shading correction on the data of captured images captured successively. The moving object detection accuracy control unit (101) controls a detection accuracy of a moving object on each data set of captured images on which the shading correction is performed. The combination unit (66) sets a combination ratio corresponding to a detection result of a moving object with an accuracy controlled by the moving object detection accuracy control unit (101), and generates data of a composite image by combining each data set of captured images captured successively by the image capture control unit (51) with this combination ratio.

10 Claims, 5 Drawing Sheets

IMAGE CAPTURE DEVICE, METHOD FOR GENERATING COMPOSITE IMAGE, AND STORAGE MEDIUM

This application is based on and claims the benefit of priority from Japanese Patent Application No. 2012-129270, filed on 6 Jun. 2012, the content of which is incorporated herein by reference.

BACKGROUND OF THE INVENTION

1. Field of the Invention

The present invention relates to an image capture device, a method for generating a composite image, and a storage medium.

2. Related Art

Conventionally, a method for generating a single image by adjusting a position of each of a plurality of images photographed by way of high-speed successive shots and then calculating the arithmetic mean of pixels, i.e. the so-called multiplane addition method, has been known from Japanese Unexamined Patent Application, Publication No. 2006-148550.

In such a multiplane addition method, it is normal for the arithmetic mean of pixels to be carried out so as to minimize blurring upon adjusting the positions, while taking consideration of the change in the position of a subject and the change in an angle of field due to blurring caused by hand movement.

On the other hand, in recent years, the camera lens system that is compact and features high magnification has been released.

In such a lens system, due to limb darkening (hereinafter, referred to as "shading") occurring in an image photographed in a state of a zoom lens moving toward a wide-angle side, a technique has been adopted which cancels the shading by performing sensitizing correction (hereinafter, referred to as "shading correction") in subsequent processing.

SUMMARY OF THE INVENTION

It is an object for the present invention to realize pixel addition processing preferably even when limb darkening (shading) occurs.

In order to achieve the object, an image capture device according to an aspect of the present invention includes: an image capture unit; an image capture control unit that controls the image capture unit so as to acquire images successively; a correction unit that performs shading correction on the images captured successively by the image capture control unit; a moving object detection control unit that controls a detection accuracy of a moving object in each of the images on which the shading correction is performed by the correction unit; and a composite image generation unit that generates a composite image in which a plurality of images captured successively is combined, based on the detection accuracy of a moving object controlled by the moving object detection control unit.

In order to achieve the object, an image capture device according to an aspect of the present invention includes: an image capture unit; an image capture control unit that controls the image capture unit so as to acquire images successively; a correction unit that performs shading correction on the images captured successively by the image capture control unit; a determination unit that determinates an accuracy of the detection result of the moving object in the image that has been shading corrected by the correction unit; and a composite image generation unit that generates a composite image in which a plurality of images captured successively is combined, based on result by the determination unit.

In order to achieve the object, a method for generating a composite image according to an aspect of the present invention includes: a correction step of performing shading correction on images captured successively; a moving object detection control step of controlling a detection accuracy of a moving object in each of the images on which shading correction is performed in the correction step; and a composite image generation step of generating a composite image by combining a plurality of images captured successively, based on the detection accuracy of a moving object controlled in the moving object detection control step.

In order to achieve the object, a method for generating a composite image according to an aspect of the present invention includes: a correction step of performing shading correction on images captured successively; a determination step of determining an accuracy of the detection result of the moving object in the image that has been shading corrected in the correction step; and a composite image generation step of generating a composite image by combining a plurality of images captured successively, based on result in the determination step.

In order to achieve the object, in accordance with an aspect of the present invention, a storage medium encoded with a computer-readable program that enables a computer controlling an image capture device equipped with an image capture unit to execute functions as: an image capture control unit that controls the image capture unit so as to acquire images successively; a correction unit that performs shading correction on the images captured successively by the image capture control unit; a moving object detection control unit that controls a detection accuracy of a moving object in each of the images on which the shading correction is performed by the correction unit; and a composite image generation unit that generates a composite image in which a plurality of images captured successively is combined, based on the detection accuracy of a moving object controlled by the moving object detection control unit.

In order to achieve the object, in accordance with an aspect of the present invention, a storage medium encoded with a computer-readable program that enables a computer controlling an image capture device equipped with an image capture unit to execute functions as: an image capture control unit that controls the image capture unit so as to acquire images successively; a correction unit that performs shading correction on the images captured successively by the image capture control unit; a determination unit that determinates an accuracy of the detection result of the moving object in the image that has been shading corrected by the correction unit; and a composite image generation unit that generates a composite image in which a plurality of images captured successively is combined, based on result by the determination unit.

DETAILED DESCRIPTION OF THE INVENTION

In the following, embodiments of the present invention are explained with reference to the drawings.

Figure 1:
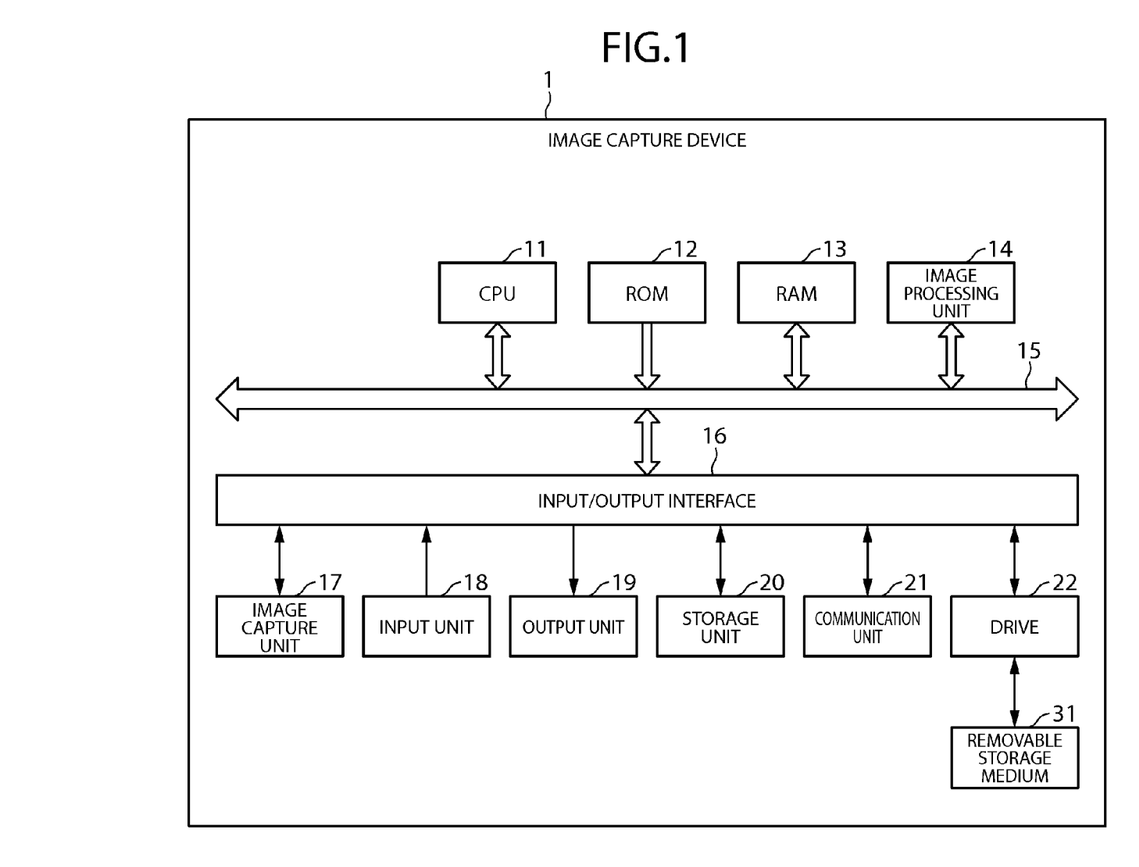
FIG. 1 is a block diagram showing a hardware configuration according to an embodiment of an image capture device of the present invention.

FIG. 1 is a block diagram showing a hardware configuration of an image capture device 1 according to an embodiment of the present invention.

The image capture device 1 is configured as, for example, a digital camera. The image capture device 1 includes a CPU (Central Processing Unit) 11, ROM (Read Only Memory) 12, RAM (Random Access Memory) 13, an image processing unit 14, a bus 15, an Input/Output interface 16, an image capture unit 17, an input unit 18, an output unit 19, a storage unit 20, a communication unit 21, and a drive 22.

The CPU 11 executes various processing according to programs that are recorded in the ROM 12, or programs that are loaded from the storage unit 20 to the RAM 13.

The RAM 13 also stores data and the like necessary for the CPU 11 to execute the various processing, as appropriate.

The image processing unit 14 is configured with a DSP (Digital Signal Processor), VRAM (Video Random Access Memory), and the like, and cooperates with the CPU 11 to perform various image processing on data of an image.

The CPU 11, the ROM 12 and the RAM 13 are connected to one another via the bus 15. The input/output interface 16 is also connected to the bus 15. The image capture unit 17, the input unit 18, the output unit 19, the storage unit 20, the communication unit 21, and the drive 22 are connected to the input/output interface 16.

The image capture unit 17 includes an optical lens unit and an image sensor.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

It should be noted that the abovementioned camera lens system is employed as the optical lens unit of the present embodiment. Therefore, although described later in detail, shading correction is performed also in the present embodiment.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 17.

Such an output signal of the image capture unit 17 is hereinafter referred to as "data of a captured image". Data of a captured image is supplied to the CPU 11, the image processing unit 14, and the like as appropriate, and stored in storage unit 20 as necessary.

The input unit 18 is configured by various buttons such as a power button, a shutter button and the like, and inputs a variety of information in accordance with instruction operations by the user.

The output unit 19 is configured by the display unit, a speaker, and the like, and outputs images and sound.

The storage unit 20 is configured by DRAM (Dynamic Random Access Memory) or the like, and stores data of various images.

The communication unit 21 controls communication with other devices (not shown) via networks including the Internet.

A removable storage medium 31 composed of a magnetic disk, an optical disk, a magneto-optical disk, semiconductor memory or the like is installed in the drive 22, as appropriate. Programs that are read via the drive 22 from the removable storage medium 31 are installed in the storage unit 20, as necessary. Similarly to the storage unit 20, the removable storage medium 31 can also store a variety of data such as the image data stored in the storage unit 20.

Figure 2:
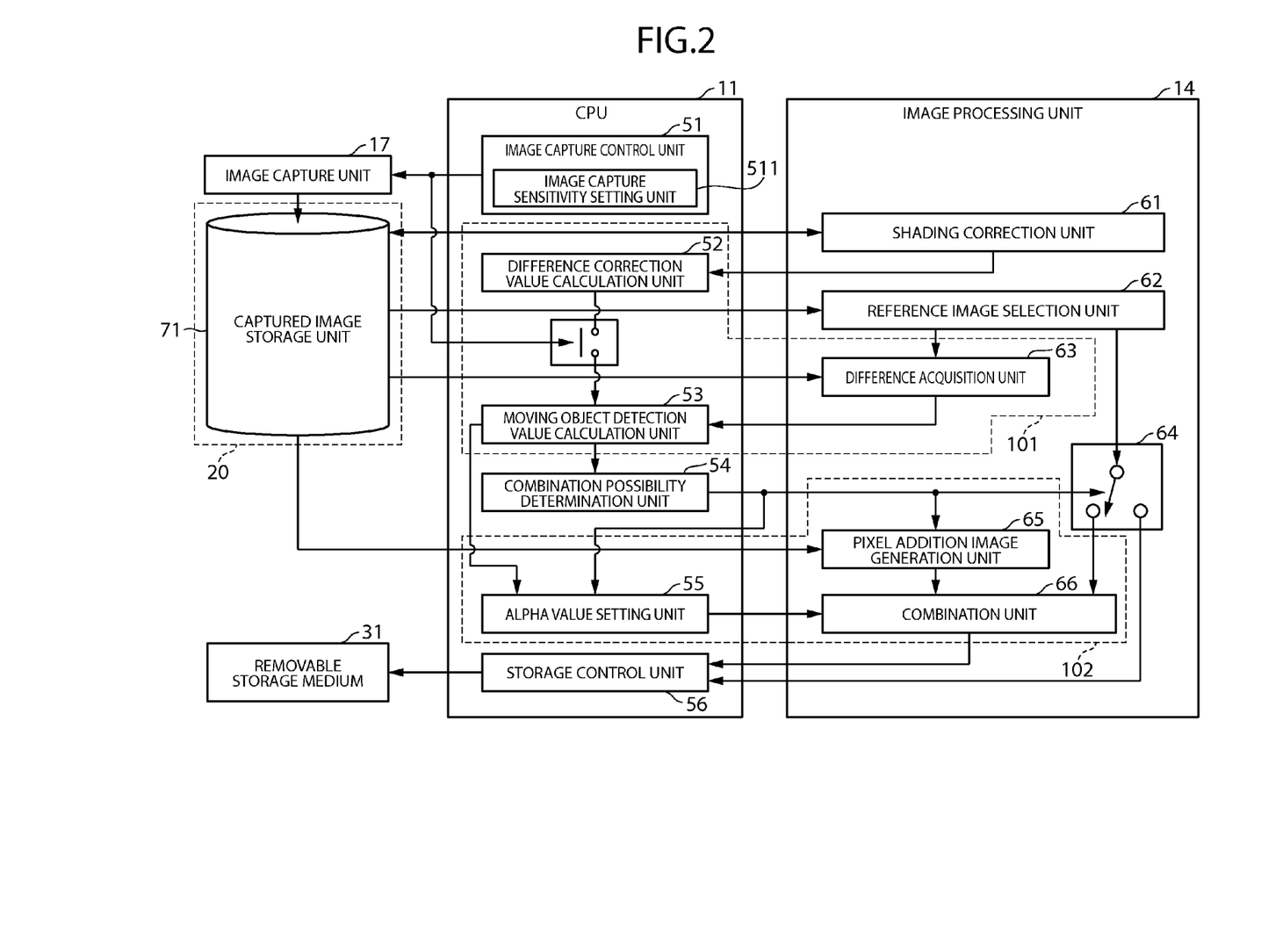
FIG. 2 is a functional block diagram showing a functional configuration for executing multiplane photographing processing from among functional configurations of the image capture device of FIG. 1.

FIG. 2 is a functional block diagram showing a functional configuration for executing multiplane photographing processing from among functional configurations of such an image capture device 1.

"Multiplane photographing processing" herein refers to a sequence of processing including: image-capturing successively and repeatedly a plurality of captured images by way of so-called high-speed successive shots; further performing image processing in accordance with the multiplane addition method upon performing shading correction on data of the plurality of captured images; and then recording data of a composite image acquired as a result thereof.

In a case of performing the multiplane photographing processing, an image capture control unit 51, a difference correction value calculation unit 52, a moving object detection value calculation unit 53, a combination possibility determination unit 54, an alpha value setting unit 55, and a storage control unit 56 function in the CPU 11.

It should be noted that the configuration in which the image capture control unit 51 through the storage control unit 56 function in the CPU 11 is merely an example. In other words, it is possible to transfer at least a part of the functions of the image capture control unit 51 through the storage control unit 56 to other constituent elements other than the CPU 11 such as the image processing unit 14, etc.

Furthermore, in a case of performing the multiplane photographing processing, a shading correction unit 61, a reference image selection unit 62, a difference acquisition unit 63, a switching unit 64, a pixel addition image generation unit 65, and a combination unit 66 function in the image processing unit 14.

It should be noted that the configuration in which the shading correction unit 61 through the combination unit 66 function in the image processing unit 14 is merely an example. In other words, it is possible to transfer at least a part of the functions of shading correction unit 61 through the combination unit 66 to other configuration elements other than the image processing unit 14 such as CPU 11, etc.

Furthermore, in a case of performing the multiplane photographing processing, a captured image storage unit 71 is provided as an area of the storage unit 20. It should be noted that the configuration in which the captured image storage unit 71 is provided as an area of the storage unit 20 is merely an example, and it may also be provided as an area of the removable storage medium 31, for example.

The image capture control unit 51 sets various image capture conditions in response to various operations and the like on the input unit 18 (FIG. 1) from a user, and controls image capture operations of the image capture unit 17 based on these various image capture conditions.

Image capture sensitivity, more specifically, ISO (International Organization for Standardization) sensitivity, is employed as one of such image capture conditions in the present embodiment, for example, and an image capture sensitivity setting unit 511 for setting the image capture sensitivity is provided at the image capture control unit 51. It should be noted that the image capture sensitivity setting by the image capture sensitivity setting unit 511 is not necessarily set in response to various operations by the user and may be automatically set upon evaluating a state (such as brightness) of an image captured, for example.

Furthermore, for example, when a shutter button (not illustrated) of the input unit 18 is pressed down to instruct to record a captured image, the image capture unit 17 performs so-called successive shot operations to image-capture a plurality of captured images successively, and outputs data of the plurality of capture images to store in the captured image storage unit 71, under control of the image capture control unit 51.

The shading correction unit 61 performs shading correction on each set of data of the plurality of captured images stored in the captured image storage unit 71.

Figure 3A:
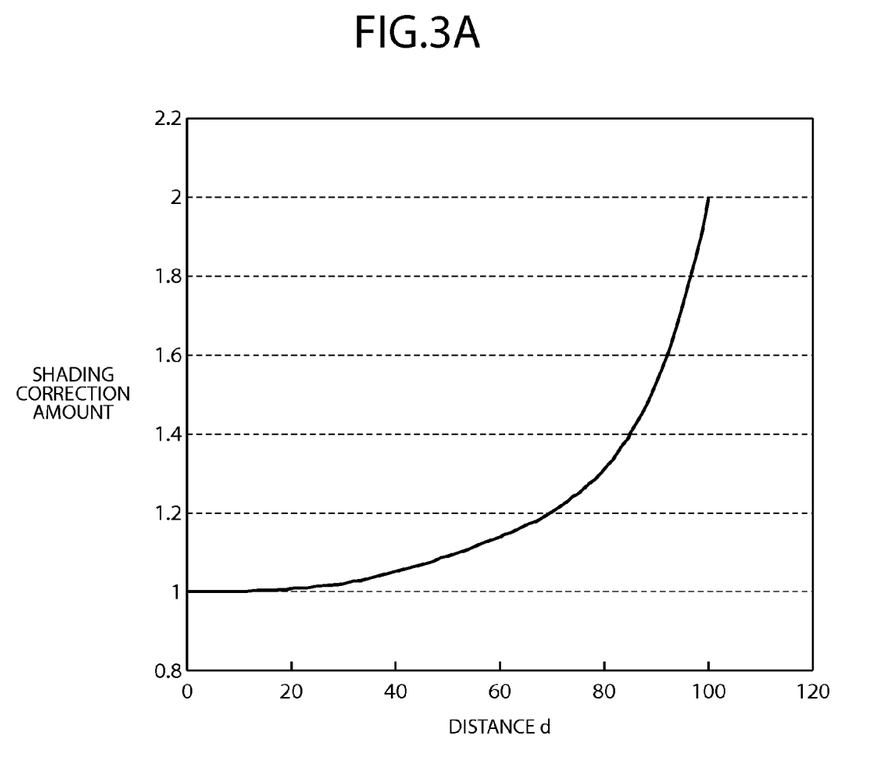
FIG. 3A is a view showing a relationship of a shading correction amount.
Figure 3B:
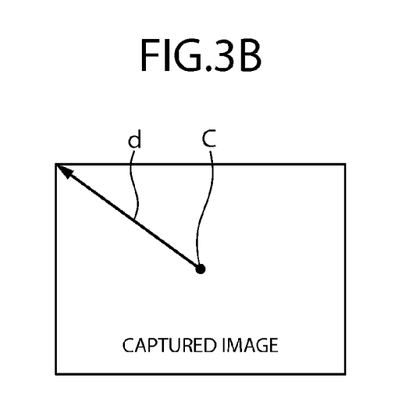
FIG. 3B is a view showing an example of a captured image as a target for shading correction.

FIG. 3A is a view showing a relationship of shading correction amount. FIG. 3B is a view showing an example of a captured image as a target for shading correction.

In the present embodiment, a center C is set within the captured image, as shown in FIG. 3B. Although the position of this center C is not limited specifically, it is set to be an intersection point of two diagonal lines of a captured image in the present embodiment.

As shown in FIG. 3A, shading correction is performed in a way such that the shading correction amount increases as a distance d from this center C becomes longer. More specifically, by multiplying a predetermined shading correction amount as gain by a pixel value of a pixel (hereinafter, referred to as "attention pixel") to which attention is paid as a processing target among each pixel constituting a captured image, a pixel value of an attention pixel is corrected.

In this case, if the position of the attention image is the center C, the shading correction amount becomes "1" and the pixel value of the attention pixel does not change (corrected by multiplying by 1).

However, as the distance d of the attention pixel from the center C becomes longer, i.e. as the position of the attention pixel moves toward the periphery of the captured image, the shading correction amount increases. Therefore, the shading correction is performed in a way such that the pixel value of the attention pixel increases in response thereto.

With reference to FIG. 2 again, the reference image selection unit 62 selects data of a reference image from among data of a plurality of captured images stored in the captured image storage unit 71, i.e. data of a plurality of captured images captured successively by means of successive shots. Although the selection method of a reference image is not specifically limited, a single image positioned close to the center when arranging a plurality of captured images in the order of photographing is selected as a reference image in the present embodiment.

For each of a reference image and captured images other than the reference image, among data of a plurality of captured images stored in the captured image storage unit 71, the difference acquisition unit 63 acquires a difference in pixel values for every corresponding pixel.

Here, ideally speaking, the difference in pixel values becomes zero in an area where a moving object does not exist, and the difference in pixel values becomes greater in an area where a moving object exists. In this way, a difference in pixel values becomes an index of moving object detection. For this reason, in conventional multiplane photographing processing, a difference in pixel values has been employed unmodified as an index value (hereinafter, referred to as "moving object detection value") indicating whether there is a moving object detected in the pixel.

However, when performing the shading correction in the conventional multiplane photographing processing (FIGS. 3A and 3B), it is corrected so that a pixel value increases in the peripheral area of a captured image (an area in which the distance d of an attention pixel from the center C is long). For this reason, noise is amplified in the peripheral area of the captured image, and thus the difference of the pixel value tends to become greater due to the noise.

If a difference in pixel values is employed as a moving object detection value unmodified in this way, the difference in pixel values will become greater due to the noise even when a moving object does not exist at a peripheral area of a captured image, a result of which a false detection of a moving object may occur.

With the multiplane method, regarding an area where a moving object is detected, a pixel addition image (described later) is not combined (or combined in a state of the degree of transparency being high) and a single reference image is employed (or combined in a state of the degree of transparency of the reference image being low). As a result of this, if a false detection of a moving object occurs at the peripheral area of the captured image, a single reference image including strong noise remains as it is, which leads to the deterioration of the image quality of the resulting composite image ultimately acquired.

Therefore, in order to prevent from false detection of a moving object and deterioration of image quality, the difference correction value calculation unit 52 and the moving object detection value calculation unit 53 function in the CPU 11 in the present embodiment.

The difference correction value calculation unit 52 calculates a value corresponding to shading correction by setting a each difference in pixel values acquired by the difference acquisition unit 63 as a correction value (hereinafter, referred to as "difference correction value").

The moving object detection value calculation unit 53 corrects the each difference in pixel values acquired by the difference acquisition unit 63 using a difference correction value, and outputs each value after correction as a moving object detection value.

Next, a specific calculation method of a moving object detection value is described.

If defining $Base(x,y)$ for a pixel value of a pixel located at a coordinate $(x,y)$ in a reference image, $Nst(x,y)$ for a pixel value of a pixel located at a coordinate $(x,y)$ in a target image that is set to be a combination target for this reference image, and $Diff(x,y)$ for a difference of a pixel in the coordinate (a moving object detection value), the relation thereamong is conventionally expressed as the following formula (1):

$$\text{Diff}(x,y) = \text{Base}(x,y) - \text{Nst}(x,y)$$

$$\text{if } (\text{Diff}(x,y) < th) \text{Sabun}(x,y) = 0 \qquad (1)$$

(In a case of the difference value being smaller than a threshold value th, Diff(x,y) becomes "0".)

However, when noise occurs greater in a peripheral direction in the image due to the shading correction, the difference in pixel values in a peripheral direction on a reference image and a target image becomes greater than it is.

Therefore, in view of this case, a difference correction value Hosei(x,y) is provided, and the following formula (2) is newly provided based on the abovementioned formula (1).

$$\text{Diff}(x,y) = \text{Base}(x,y) - \text{Nst}(x,y) / \text{Corr}(x,y)$$

$$\text{If } (\text{Diff}(x,y) < th) \text{Diff}(x,y) = 0 \qquad (2)$$

(In a case of the difference value being smaller than a threshold value th, Diff(x,y) becomes "0".)

Here, for the difference correction value Corr(x,y) of the present embodiment, a value is employed that becomes greater according to the shading correction amount, i.e. a value that becomes greater as the distance d from the center C becomes longer. Then, at the peripheral area of the image, since the difference in pixel values which became greater due to noise (Base(x,y)−Nst(x,y)) is divided by the difference correction value Corr(x,y) which also became greater, a value that is smaller than the value divided by the formula (1) is produced as the moving object detection value Diff(x,y) as a result. The matter of the moving object detection value Diff(x,y) becoming smaller indicates that false detection of a moving object due to the noise caused by the shading correction is suppressed by the amount by which the value became smaller.

Referring back to FIG. 2, the combination possibility determination unit 54 determines whether the combination of the multiplane method is required, i.e. whether the combination of the reference image and a pixel addition image (described later) is required, by comparing the moving object detection value calculated by the moving object detection value calculation unit 53 with a predetermined threshold value (a value different from the threshold value th).

More specifically, if a target image exists for which the moving object detection value is greater than the predetermined threshold value, the combination possibility determination unit 54 determines not to combine since it is likely that it is not possible to combine properly due to the movement of the moving object being too large. On the other hand, if moving object detection values are less than the predetermined threshold value in all of the target images, the combination possibility determination unit 54 determines to combine.

The determination results of the combination possibility determination unit 54 are notified to the alpha value setting unit 55, the switching unit 64, and the pixel addition image generation unit 65, respectively.

If the combination possibility determination unit 54 determines not to combine, the switching unit 64 switches an output destination to the storage control unit 56 side. Furthermore, the alpha value setting unit 55 and the pixel addition image generation unit 65 inhibit executing the processing.

In this way, data of a reference image selected by the reference image selection unit 62 is a single image which is not combined with data of a pixel addition image (described later) and is supplied to the storage control unit 56 through the switching unit 64.

The storage control unit 56 stores the data of a reference image in the removable storage medium 31 for recording purpose.

On the other hand, if the combination possibility determination unit 54 determines to combine, the switching unit 64 switches the output destination to the combination unit 66 side. Furthermore, the alpha value setting unit 55 and the pixel addition image generation unit 65 enter a state in which the processing can be executed.

For data of captured images other than the reference images (each target image) among data of a plurality of captured images stored in the captured image storage unit 71, the alpha value setting unit 55 sets an alpha value, by pixel unit, based on a moving object detection value of pixel unit.

Alpha value is a value representing a degree of transparency used upon combining a reference image and a pixel addition image (described later). Combination using such an alpha value is also called "alpha blend".

Here, a map showing a two-dimensional distribution state of such an alpha value, i.e. an image having each alpha value as each pixel value and having the same resolution as a captured image is called "alpha map image". In the present embodiment, the alpha value setting unit 55 generates data of an alpha map image as a result of setting an alpha value, and supplies this to the combination unit 66.

Figure 4:
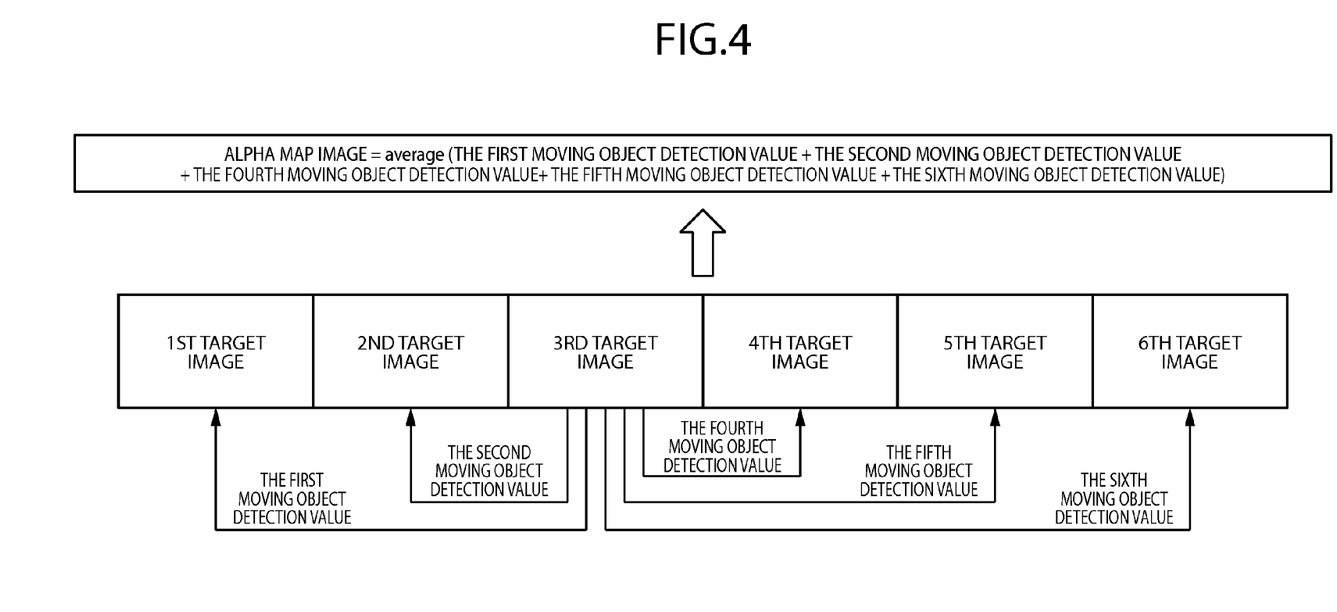
FIG. 4 is a view illustrating an example of a generation method of data of an alpha map image in composite image generation.

FIG. 4 is a view illustrating an example of a generation method of data of an alpha map image.

In the example of FIG. 4, successive shooting of six captured images is conducted, and the third captured image is selected as a reference image.

In this case, as described above, a value generated by the difference Diff between the n-th target image (n is an integer from 1 through 6 except for 3) and the reference image being divided by a difference correction value Corr is calculated as the n-th moving object detection value (hereinafter, referred to as "the n-th moving object detection value").

Then, the alpha value setting unit 55 calculates an average value of the first moving object detection value to the sixth moving object detection value of these for each pixel, and generates data of an alpha map image for which an average value for each pixel is set as each alpha value, and supplies this to the combination unit 66.

Referring back to FIG. 2, the pixel addition image generation unit 65 generates data of an image (hereinafter, referred to as "pixel addition image") including an arithmetic mean value as a pixel value by performing arithmetic mean on each pixel value for the data of each captured image other than the reference image (each target image) among the data of a plurality of captured images stored in the captured image storage unit 71.

The combination unit 66 generates data of a composite image by combining (alpha-blending) data of a pixel addition image generated by the pixel addition image generation unit 65 and data of a reference image selected by the reference image selection unit 62 and supplied through the switching unit 64 by way of using data of an alpha map image generated by the alpha value setting unit 55.

More specifically, the combination unit 66 generates data of a composite image by performing the alpha blending represented by the following formula (3) by pixel unit.

$$\text{Composite image} = (1-\alpha)*\text{pixel addition image} + \alpha*\text{reference image} \qquad (3)$$

Here, as described above, an average value of each of the moving object detection values of the data of the captured image other than the reference image (each target image)

among data of a plurality of captured images stored in the captured image storage unit 71 is employed for the alpha value.

The moving object detection value is not merely a difference between a target image and a reference image, but a value calculated by the difference being divided by a difference correction value. Then, the difference correction value is set so as to become greater according to the shading correction amount.

Therefore, since an alpha value is set to become smaller at a periphery of a captured image where the shading correction amount becomes greater, combination is executed in such a way that the influence from a reference image (the influence of noise generated at the circumference) becomes smaller in accordance with formula (3). As a result of this, it is possible to acquire data of a composite image with high quality in which the influence of noise at the periphery becomes small.

In other words, conventionally, for a moving object detection value which is set as an index for setting an alpha value, a difference between a target image and a reference image is simply employed in the same way regardless of whether being the center C or the periphery away from the center C by the distance d.

In such a case, if performing the shading correction on a target image and a reference image, since pixel values at the circumference are amplified with respect to the center C, the difference thereof is equally amplified. Employing such an amplified difference value in a moving object detection value indicates raising the detection accuracy of a moving object unnecessarily (becoming excessively sensitive), a result of which a difference attributed to noise contents is also amplified, so that the difference is falsely detected as a moving object.

Conversely, if merely lowering the detection accuracy of a moving object over an entire captured image with the purpose of suppressing false detection of a moving object at the periphery, a moving object which actually exists at the center C may not be detected.

Therefore, in the present embodiment, the image capture device 1 employs, as a moving detection value, a value calculated by a difference between a target image and a reference image being divided by a difference correction value corresponding to a shading correction amount. In this way, it is controlled to maintain the detection accuracy of a moving object at the center C, while lowering the detection accuracy of a moving object at the circumference to an appropriate level.

In other words, it is understood that, in the present embodiment, the difference correction value calculation unit 52, the difference acquisition unit 63, and the moving object detection value calculation unit 53 function as a moving object detection accuracy control unit 101 that control the accuracy of a moving object detection in a captured image on which the shading correction is performed.

Based on the present embodiment, the moving object detection accuracy control unit 101 combines each data of a pixel addition image and a reference image with a state in which the accuracy of a moving object on a target image and a reference image on which the shading correction is performed is appropriately controlled. As a result of this, the influence of noise at the periphery becomes smaller and an appropriate combination is conducted at an image center so that data of a composite image with high quality can be acquired.

In this way, the storage control unit 56 stores the data of a composite image generated by the combination unit 66 in the removable storage medium 31 for recording purpose.

Figure 5:
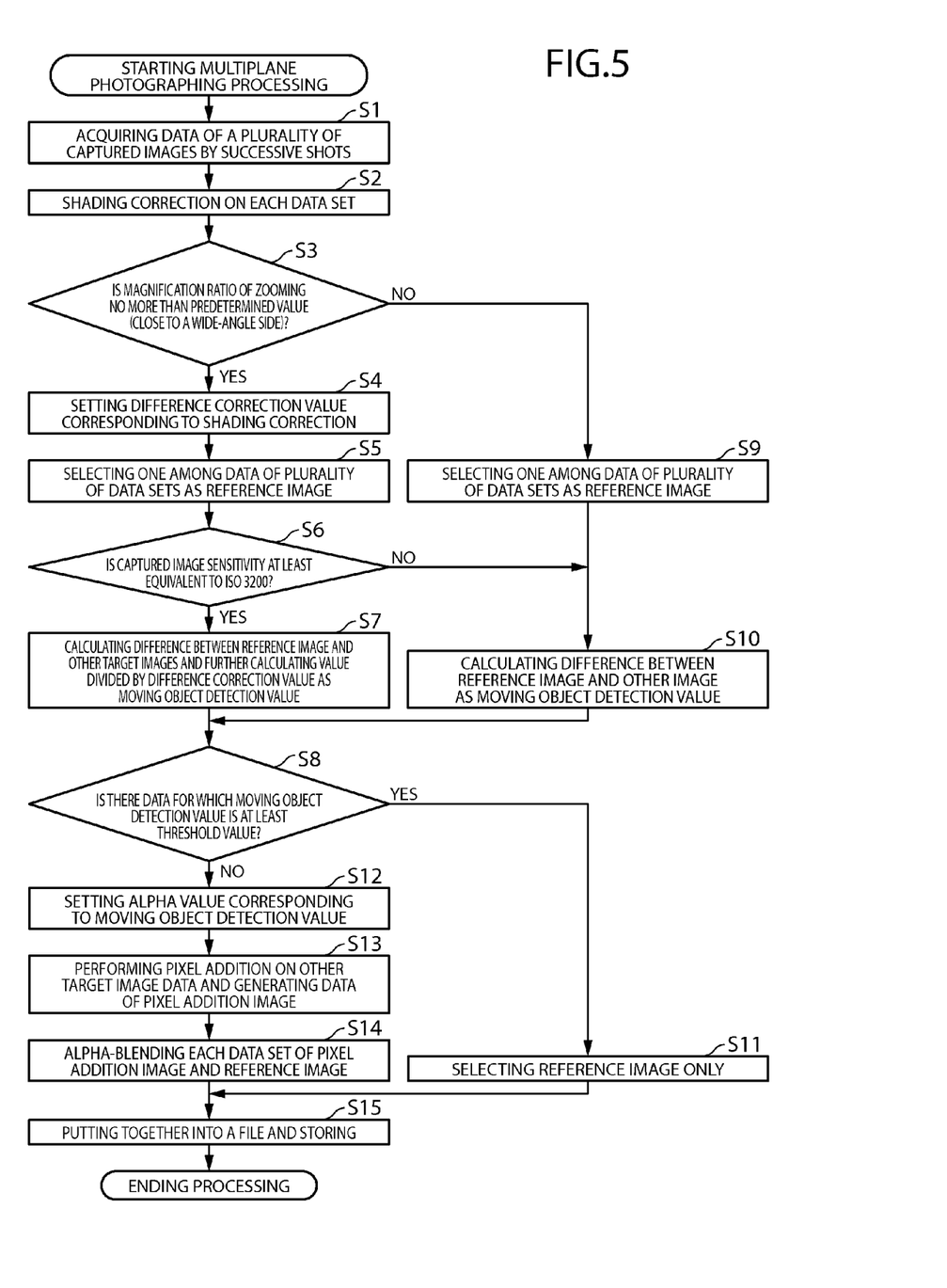
FIG. 5 is a flowchart showing a flow of multiplane photographing processing executed by the image capture device of FIG. 1 having the functional configuration of FIG. 2.

Next, with reference to FIG. 5, the multiplane photographing processing executed by the image capture device 1 of the functional configuration of FIG. 2 above is described.

FIG. 5 is a flowchart showing a flow of multiplane photographing processing executed by the image capture device 1 of FIG. 1 having the functional configuration of FIG. 2.

The multiplane photographing processing is started upon a pressing operation on a shutter button of the input unit 18 by a user after a predetermined operation on the input unit 18 by the user, and the following processing is executed.

In Step S1, the image capture unit 17 acquires data of a plurality of captured images by successive shooting under the control of the image capture control unit 51, and stores these in the captured image storage unit 71.

Various image capture conditions such as magnification ratio of zooming and image capture sensitivity are set at the image capture control unit 51 at this stage. It should also be noted that image capture sensitivity is set by the image capture sensitivity setting unit 511.

In Step S2, the shading correction unit 61 performs the shading correction on each set of data of a plurality of captured image acquired in the processing of Step S1.

In Step S3, the image capture control unit 51 determines whether the magnification ratio of zooming is equal to or lower than a predetermined value, i.e. whether it is closer to a wide-angle side.

If the magnification ratio of zooming exceeds a predetermined value, i.e. if it is not closer to a wide-angle side, a NO determination is made in Step S3 and the processing advances to Step S9. The processing of Step S9 and higher is described later.

On the other hand, if the magnification ratio of zooming is lower than a predetermined value, i.e. if it is closer to a wide-angle side, a YES determination is made in Step S3 and the processing advances to Step S4.

In Step S4, the difference correction value calculation unit 52 sets a difference correction value corresponding to shading correction of Step S2.

In Step S5, the reference image selection unit 62 selects one among the data of a plurality of captured images acquired in the processing of Step S1 as the data of a reference image.

In Step S6, the image capture sensitivity setting unit 511 determines whether the image capture sensitivity set at the time of the processing of Step S1 is at least equivalent to ISO 3200.

If it is less than ISO 3200, a NO determination is made in Step S6 and the processing advances to Step S10. The processing of Step S10 and higher is described later.

On the other hand, if the magnification ratio of zooming is no more than a predetermined value and the image capture sensitivity is at least equivalent to ISO 3200, it is anticipated that the influence of noise at the periphery of the captured image will be greater by the shading correction. Therefore, if merely employing a difference of pixels as a moving object detection value, as is conventionally done, it is likely that false detection of a moving object due to the noise will occur. Therefore, in such a case, the accuracy of moving object detection in a captured image on which the shading correction is performed is appropriately controlled by executing the processing of the following Step S7 and higher upon a YES determination being made in Step S6.

In other words, in Step S7, the difference acquisition unit 63 calculates a difference in pixel values, for each corresponding pixel of each of a reference image and captured images other than the reference image (target images) acquired in the processing of Step S5 among data of a plurality of captured images acquired in the processing of Step S1, and furthermore, the moving object detection value calculation unit 53 calculates a value calculated by the difference being divided by a difference correction value as a moving object detection value.

In Step S8, the combination possibility determination unit 54 determines whether there is data of a target image for which a moving object detection value is at least a threshold value.

If there is data of a target image for which a moving object detection value is at least the threshold value, since it is determined that combination is unnecessary, a YES determination is made in Step S8 and the processing advances to Step S11.

In the course of the processing advancing to Step S11, the switching unit 64 switches an output destination to the storage control unit 56 side. Furthermore, the alpha value setting unit 55 and the pixel addition image generation unit 65 inhibit executing the processing. In this way, data of a reference image selected by the processing in Step S5 is a single image which is not combined with data of a pixel addition image and is supplied to the storage control unit 56 through the switching unit 64.

In Step S11, the storage control unit 56 selects only a reference image as a recording target.

In Step S15, the storage control unit 56 puts together data of a reference image into a file for the purpose of recording and stores in the removable storage medium 31.

Then, the multiplane photographing processing ends.

On the other hand, if there is no data of a target image for which a moving object detection value is at least a threshold value, since it is determined that combination is necessary, a NO determination is made in Step S8 and the processing advances to Step S12 and the following sequence of processing is executed.

In Step S12, for data of captured images other than a reference image (each target image) among data of a plurality of captured images acquired in the processing of Step S1, the alpha value setting unit 55 sets an alpha value, by pixel unit, corresponding to a moving object detection value of pixel unit. In other words, data of an alpha map image is generated.

In Step S13, the pixel addition image generation unit 65 performs pixel addition for data of each captured image other than a reference image (each target image) to generate data of a pixel addition image.

In Step S14, the combination unit 66 generates data of a composite image by alpha-blending each data set of a pixel addition image and a reference image using data of an alpha map image.

In Step S15, the storage control unit 56 puts together data of a composite image into a file for the purpose of recording and stores in the removable storage medium 31.

Then, the multiplane photographing processing ends.

The flow of the multiplane photographing processing in a case in which the magnification ratio of zooming is no more than a predetermined value (close to a wide-angle side) and the captured image sensitivity is at least equivalent to ISO 3200 is described above.

Next, the flow of multiplane photographing processing in another case is described below.

First, in a case in which the magnification ratio of zooming exceeds a predetermined value, i.e. in a case in which it is not close to a wide-angle side, limb darkening (shading) hardly occurs. Therefore, similarly to the conventional manner, employing a difference in pixel values as a moving object detection value does not cause any particularly problem.

Therefore, in such a case, a NO determination is made in Step S3 and the processing advances to Step S9, and the following sequence of processing is executed.

In other words, in Step S9, the reference image selection unit 62 selects one among the data of a plurality of captured images acquired in the processing of Step S1 as data of a reference image.

In Step S10, the difference acquisition unit 63 calculates a difference in pixel values, for every corresponding pixel of each of a reference image and captured images other than the reference image (target images) selected in the processing of Step S9, among data of a plurality of captured images acquired in the processing of Step S1, and furthermore, the moving object detection value calculation unit 53 calculates the difference directly as a moving object detection value.

In Step S8, the combination possibility determination unit 54 determines whether there is data of a target image for which a moving object detection value is at least a threshold value.

If there is data of a target image for which a moving object detection value is at least a threshold value, since it is determined that combination is unnecessary, a YES determination is made in Step S8. Then, in Step S11, only a reference image is selected as a recording target, and in Step S15, data of the reference image is put together into a file for the purpose of recording and stored in the removable storage medium 31.

Then, the multiplane photographing processing ends.

On the other hand, if there is no data of a target image for which a moving object detection value is at least a threshold value, since it is determined that combination is necessary, a NO determination is made in Step S8 and the processing advances to Step S12.

In Step S12, data of an alpha map image is generated by setting an alpha value by pixel unit. Then, in Step S13, data of a pixel addition image is generated, and in Step S14, data of a composite image is generated by alpha-blending each data of a pixel addition image and a reference image using data of an alpha map image.

Then, in Step S15, data of the composite image is put together into a file for the purpose of recording and stored in the removable storage medium 31.

The multiplane photographing processing thereby comes to an end.

Next, the multiplane photographing processing in a case in which the magnification ratio of zooming is no more than a predetermined value (close to a wide-angle side) and the captured image sensitivity is less than ISO 3200 is described.

In a case in which the captured image sensitivity is less than ISO 3200, i.e. in a case of a bright photographing environment, since it can be determined that the influence of noise around a captured image after the shading correction is low, similarly to the conventional manner, employing a difference in pixel values as a moving object detection value does not cause any particular problem.

Therefore, in such a case, a NO determination is made in Step S6 and the processing advances to Step S10, and then, processing similar to the abovementioned processing in a case in which the magnification ratio of zooming exceeds a predetermined value is executed.

It should be noted that the configuration employing ISO 3200 as a threshold value to be compared to the captured image sensitivity in Step S6 is merely an example. In other words, designers, etc. may arbitrarily set a threshold to be compared to a captured image sensitivity, depending on to what extent the designers, etc. consider the influence of noise around a captured image after the shading correction, and may also dynamically set a threshold for comparison along with a correction amount corresponding to the ISO sensitivity without providing a threshold for comparison.

It should be noted that the present invention is not to be limited to the aforementioned embodiment, and that modifications, improvements, etc. within a scope that can achieve the object of the present invention are also included in the present invention.

For example, the detection result of a moving object for which the accuracy is controlled by the moving object detection accuracy control unit 101 is employed for image processing according to the multiplane addition method in the above-mentioned embodiment. However, the use thereof is not limited thereto. For example, it is possible to employ the detection result of a moving object for which the accuracy is controlled by the moving object detection accuracy control unit 101 for various image processing such as tracking processing of a subject in a moving image.

In the aforementioned embodiments, a digital camera has been described as an example of the image capture device 1 to which the present invention is applied; however, the present invention is not particularly limited thereto. For example, the present invention can be applied to any electronic device in general having at least either one of an image capture function of capturing a captured image and a receiving function of receiving a captured image through communication. More specifically, for example, the present invention can be applied to a smart phone, a lap-top personal computer, a television, a video camera, a portable navigation device, a smart phone, a cell phone device, a portable gaming device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the image capture device 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable storage medium 31 shown in FIG. 1 distributed separately from the device main body for supplying the program to a user, but also can be constituted by a storage medium or the like supplied to the user in a state incorporated in the device main body in advance. The removable storage medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The removable storage medium supplied to the user in a state incorporated in the device main body in advance may include, for example, the ROM 12 shown in FIG. 1, a hard disk included in the storage unit 20 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

In addition, in the present specification, a term system shall mean a general device configured from a plurality of devices, a plurality of means, and the like.

Although some embodiments of the present invention have been described above, the embodiments are merely exemplification, and do not limit the technical scope of the present invention. Other various embodiments can be employed for the present invention, and various modifications such as omission and replacement are possible without departing from the sprits of the present invention. Such embodiments and modifications are included in the scope of the invention and the summary described in the present specification, and are included in the invention recited in the claims as well as the equivalent scope thereof.

What is claimed is:

1. An image capture device comprising:
    an image capture unit;
    an image capture control unit that controls the image capture unit so as to acquire images successively;
    a correction unit that performs shading correction on the images captured successively by the image capture control unit;
    a selection unit that selects a first image from the images on which the shading correction is performed by the correction unit;
    a difference acquisition unit that acquires a difference between the first image selected by the selection unit and a plurality of images other than the first image;
    a determination unit that determines an influence of noise in a peripheral area of the images on which the shading correction is performed by the correction unit, that affects an acquisition of a difference by the difference acquisition unit;
    a moving object detection accuracy control unit that controls a detection accuracy of a moving object in each of the images in accordance with the difference acquired by the difference acquisition unit, based on a determination result by the determination unit; and
    a composite image generation unit that generates a composite image in which a plurality of images captured successively are combined, based on the detection accuracy of the moving object controlled by the moving object detection accuracy control unit.

2. The image capture device according to claim 1, wherein the moving object detection accuracy control unit further controls the detection accuracy of the moving object in each of the images on which the shading correction is performed by the correction unit, based on a correction amount of the shading correction by the correction unit, and
    wherein the composite image generation unit generates the composite image by combining the first image selected by the selection unit with a plurality of images other than the first image.

3. The image capture device according to claim 2, further comprising:
    a calculation unit that calculates a moving object detection value which is an index for detecting a moving object included in an image, based on the difference acquired by the difference acquisition unit and the correction amount of the shading correction by the correction unit, wherein the detection accuracy of the moving object is defined as the moving object detection value calculated by the calculation unit.

4. The image capture device according to claim 3, further comprising:
a determination unit that determines whether the moving object detection value calculated by the calculation unit is within a predetermined range; and
a recording control unit that performs control so as to record the composite image generated by the composite image generation unit when the moving object detection value is determined as being within the predetermined range by the determination unit, and so as to record the first image when the moving object detection value is determined as not being within the predetermined range by the determination unit.

5. The image capture device according to claim 3, wherein the composite image generation unit includes:
a pixel addition unit that acquires a pixel addition image by performing pixel addition on a plurality of images other than the first image;
a setting unit that sets a degree of transparency corresponding to the moving object detection value calculated by the calculation unit, for the pixel addition image acquired by the pixel addition unit; and
a blending unit that blends the pixel addition image and the first image based on the degree of transparency set by the setting unit.

6. The image capture device according to claim 5, wherein the setting unit sets the degree of transparency by averaging moving object detection values calculated by the calculation unit.

7. The image capture device according to claim 5, further comprising:
an image capture sensitivity setting unit that sets an image capture sensitivity at a time of capturing an image according to control of the image capture control unit,
wherein the calculation unit calculates the moving object detection value by correcting the difference acquired by the difference acquisition unit, in accordance with a correction amount corresponding to the image capture sensitivity set by the image capture sensitivity setting unit and the correction amount of the shading correction by the correction unit.

8. The image capture device according to claim 5, wherein the composite image generation unit combines the pixel addition image with the first image in a case in which the moving object detection value calculated by the calculation unit is within a predetermined range.

9. A method for generating a composite image comprising:
performing shading correction on images captured successively;
selecting a first image from the images on which the shading correction is performed;
acquiring a difference between the selected first image and a plurality of images other than the first image;
determining an influence of noise in a peripheral area of the images on which the shading correction is performed, that affects the acquiring the difference;
controlling a detection accuracy of a moving object in each of the images in accordance with the acquired difference, based on the determination on the influence of the noise; and
generating a composite image in which a plurality of images captured successively are combined, based on the controlled detection accuracy of the moving object.

10. A non-transitory storage medium storing a computer-readable program that enables a computer controlling an image capture device equipped with an image capture unit to function as units comprising:
an image capture control unit that controls the image capture unit so as to acquire images successively;
a correction unit that performs shading correction on the images captured successively by the image capture control unit;
a selection unit that selects a first image from the images on which the shading correction is performed by the correction unit;
a difference acquisition unit that acquires a difference between the first image selected by the selection unit and a plurality of images other than the first image;
a determination unit that determines an influence of noise in a peripheral area of the images on which the shading correction is performed by the correction unit, that affects an acquisition of a difference by the difference acquisition unit;
a moving object detection accuracy control unit that controls a detection accuracy of a moving object in each of the images in accordance with the difference acquired by the difference acquisition unit, based on a determination result by the determination unit; and
a composite image generation unit that generates a composite image in which a plurality of images captured successively are combined, based on the detection accuracy of the moving object controlled by the moving object detection accuracy control unit.

* * * * *